US011108622B2

(12) United States Patent
Nandy et al.

(10) Patent No.: US 11,108,622 B2
(45) Date of Patent: Aug. 31, 2021

(54) PROTOCOL-INDEPENDENT MULTICAST DESIGNATED ROUTER (PIM-DR) FAILOVER IN A MULTI-CHASSIS ENVIRONMENT

(71) Applicant: HEWLETT PACKARD ENTERPRISE DEVELOPMENT LP, Houston, TX (US)

(72) Inventors: Tathagata Nandy, Bangalore (IN); Venkatavaradhan Devarajan, Bangalore (IN); Guru Gurram Janardhan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 16/690,290

(22) Filed: Nov. 21, 2019

(65) Prior Publication Data

US 2020/0177438 A1    Jun. 4, 2020

(30) Foreign Application Priority Data

Nov. 29, 2018   (IN) ............................. 201841045151

(51) Int. Cl.
*G06F 11/00*   (2006.01)
*H04L 12/24*   (2006.01)
*H04L 12/18*   (2006.01)

(52) U.S. Cl.
CPC .......... *H04L 41/0654* (2013.01); *H04L 12/18* (2013.01); *H04L 41/0668* (2013.01); *H04L 41/0672* (2013.01); *H04L 41/0836* (2013.01)

(58) Field of Classification Search
CPC ............. H04L 41/0654; H04L 41/0836; H04L 41/0672; H04L 41/0668; H04L 12/18
See application file for complete search history.

(56) References Cited

U.S. PATENT DOCUMENTS

| 7,860,093 | B2 |   | 12/2010 | Shepherd et al. |
| 8,102,848 | B1 | * | 1/2012  | Rao ........................ H04L 45/22 370/390 |

(Continued)

OTHER PUBLICATIONS

"Cisco Nexus 7000 Series NX-OS Multicast Routing Configuration Guide", Feb. 20, 2012, 192 Pages (Year: 2012).*

(Continued)

*Primary Examiner* — Richard G Keehn
(74) *Attorney, Agent, or Firm* — Sheppard Mullin Richter & Hampton LLP

(57) ABSTRACT

Systems and methods are provided for performing a node-level redundant failover-type process with respect to the protocol-independent multicast (PIM) functionality in a multi-chassis environment. When a PIM-related failure occurs on a first network device, but otherwise it remains operational, a second network device is configured to assume responsibility for performing PIM data traffic forwarding. Upon detecting the PIM-related failure of the first network device, the second network device sends a PIM-DR failover event signal to the second network device's PIM module by loading multicast route states used by the first network device into the PIM data traffic forwarding hardware of the second network device. Upon the second network device assuming responsibility, the first network device disables its PIM data traffic forwarding functionality.

20 Claims, 9 Drawing Sheets

(56) References Cited

U.S. PATENT DOCUMENTS

| | | | |
|---|---|---|---|
| 8,218,429 B2 | 7/2012 | Wang et al. | |
| 8,345,536 B1 * | 1/2013 | Rao | H04L 45/58 |
| | | | 370/216 |
| 8,576,702 B2 | 11/2013 | Boddapati et al. | |
| 8,576,703 B2 | 11/2013 | Dholakia | |

OTHER PUBLICATIONS

Cisco, "IP Multicast: Multicast Configuration Guide, Cisco IOS XE Fuji 16.8.x (Cisco ASR 900 Series)," Nov. 13, 2018, https://www.cisco.com/c/en/us/td/docs/ios-xml/ios/ipmulti_pim/configuration/xe-3s/asr903/16-8-1/b-lmc-plm-xe-16-8-1-asr900.html.

Cisco Systems, Inc., "Cisco Nexus 7000 Series NX-OS Multicast Routing Configuration Guide," Feb. 20, 2012, https://www.cisco.com/c/en/us/td/docs/switches/datacenter/sw/nx-os/multicast/configuration/guide/b_multicast_6x.pdf.

McBride, M., "IP Multicast and Multipoint Design for IPTV Services," Cisco Systerries, Inc., Oct. 12, 2008, https://archive.nanog.org/meetings/nanog44/presentations/Sunday/McBride_iptv_N44.pdf.

* cited by examiner

PROTOCOL-INDEPENDENT MULTICAST DESIGNATED ROUTER (PIM-DR) FAILOVER IN A MULTI-CHASSIS ENVIRONMENT

DESCRIPTION OF RELATED ART

Link aggregation (LA) is a method of increasing throughput within a computer network by combining multiple network connections in parallel to create an LA group (LAG). All of the network connections or links within a LAG act as a single, high-bandwidth link, with each link working in concert. If one link fails, the other links within the LAG carry the traffic load that would have been carried on the failed link, providing redundancy for communication data paths. In this way, communications destined for, e.g., a device, need not be lost due to the failure of a single connection.

One method of link aggregation used in computer networks (e.g., local area network (LAN), wide area network (WAN), etc.) is to create one or more multi-chassis link aggregation groups (MC-LAG). Traditionally, a LAG combines network ports on a single device together. With MC-LAG, the network ports included within the LAG terminate on two or more different chassis. A client device (or a source device) forms a logical LAG interface with two separate chassis (MC-LAG peers). The MC-LAG peers can be configured to share the traffic load, increasing total throughput and enhancing connection reliability.

Moreover, the MC-LAG peers are synchronized, with data traffic replicated and transmitted to each other through an inter-chassis link (ICL). This provides node-level redundancy in addition to the link-level redundancy of a traditional LAG. If an MC-LAG device goes down, the other MC-LAG peers can take up the work of the down device by beginning to forward the replicated data traffic to the client downstream clients. This peer failover helps to minimize traffic losses when a MC-LAG device goes down by reducing the time to achieve network convergence.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
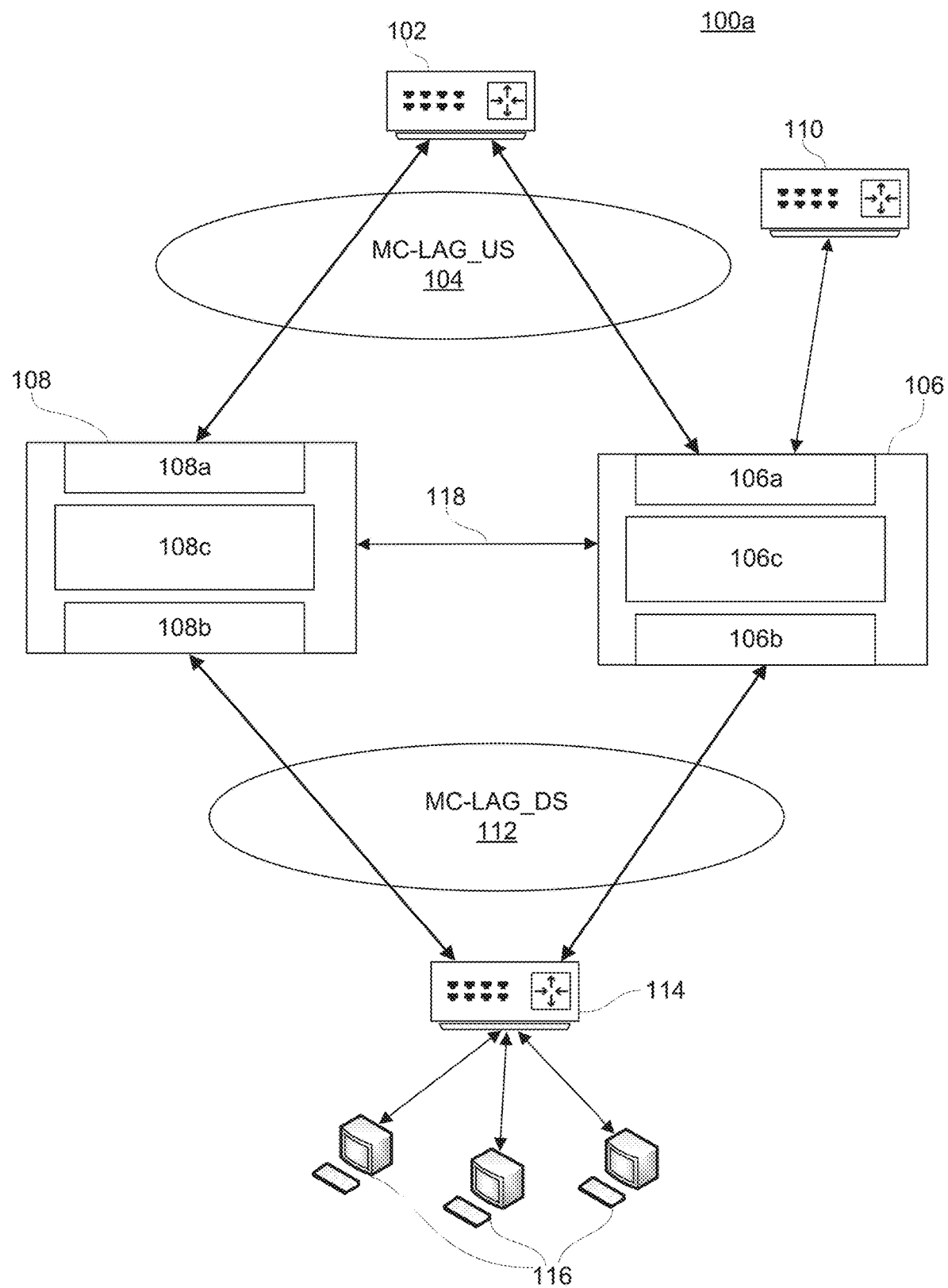
FIG. 1A illustrates an example network in accordance with embodiments of the technology disclosed herein.

The figures are not exhaustive and do not limit the present disclosure to the precise form disclosed.

DETAILED DESCRIPTION

Protocol-independent multicast (PIM) enables the delivery of a single stream of information to multiple hosts within a computer network. As an alternative to broadcast transmissions (which sends packets to all clients), PIM-enabled routers replicate multicast packets from a source and delivers those packets to multiple clients. PIM reduces the burden on sources or clients in a network by reducing the amount of duplicate packets necessary to be sent to reach multiple intended destinations.

The PIM standard outlines a PIM graceful restart function, which is a multicast high availability enhancement. The PIM graceful restart work to reestablish multicast static routes (mroutes) after a route processor (RP) switchover. Mroutes allow for multicast paths to diverge from unicast paths, enabling multicast packets to be received by a destination (e.g., client) over a different path (a multicast path) than the unicast path. In a PIM-enabled network device (e.g., a switch) with PIM graceful restart functionality, two RPs are included, with one RP being "active" while the other is "standby." During steady state, the active RP receives periodic PIM Join messages from PIM neighbors (i.e., the devices connected to the PIM-enabled device). The periodic PIM Join messages act to refresh mroutes and serve to ensure the connection. When the active RP fails, the standby RP becomes the new active RP, sending a PIM Hello message to all the PIM neighbors. The PIM Hello message includes a new generation ID (GenID) value. PIM neighbors who receive the PIM Hello message send a triggered PIM Join message back to the new active RP, reestablishing the mroutes with the new active RP.

However, it takes time to reestablish all the mroutes with the new active RP. During the time it takes for the PIM network to converge, data traffic is still transmitting, resulting in traffic losses. The greater the convergence time, the greater the traffic loss. This limitation of the PIM graceful restart is exacerbated when a large number of connections must be reestablished, such as in a LAG environment. The convergence time could be on the order of minutes, which is a long time with respect to data traffic in a computer network.

This limitation of the PIM graceful restart functionality impacts the effectiveness of MC-LAG node-level redundancy when the MC-LAG peers are PIM-enabled. Each MC-LAG peer includes a PIM module to facilitate PIM functionality. Each PIM module includes an active RP and a standby RP under the standard. However, to ensure proper functioning within a PIM network, one of the MC-LAG peers needs to serve as a designated router, or DR, that is responsible for forwarding all the PIM data traffic. Each of the other MC-LAG peers is configured as a Proxy DR, having all the functionalities of the DR except for PIM traffic forwarding. For other, non-PIM traffic, the MC-LAG peers could each operate in the traditional MC-LAG manner (e.g., load sharing, etc.).

Node-level redundancy arises from the synchronization of the MC-LAG peers, allowing for the other chasses to take over the duties of a peer chassis that has failed. With PIM-enabled chasses, however, this failover functionality is limited because failure of a PIM module of the DR does not mean that the DR has fully gone down. In such cases, the traditional peer failover of the MC-LAG would not be triggered, and the PIM module of the DR would enter the PIM graceful restart process. Performing the traditional failover in full would result in conflicts because the MC-LAG peer serving as the DR for PIM data traffic, though still operational, would be considered "DOWN" by the other MC-LAG peer(s). Because the non-DR MC-LAG peer would take over all of the responsibilities of the DR MC-LAG peer when it is marked as "DOWN", communication conflicts would result, with both devices attempting to send the same non-PIM traffic to the same devices. Therefore, the effectiveness of the traditional failover function of an MC-LAG is negated, as the forwarding responsibility of the DR for PIM forwarding remains with the MC-LAG serving as the DR and the convergence time is dictated by the PIM graceful restart process.

Embodiments of the technology disclosed herein provide systems and methods for reducing convergence time in a PIM network. As will be discussed in greater detail, embodiments in accordance with the present disclosure enables selective use of device-level failover functionality where an RP failure occurs on the DR. When the Proxy DR receives the PIM Hello packet from the DR (indicating an RP failure), the Proxy DR identifies that an error has occurred at the DR. The Proxy DR sends a DR failover event message to its PIM module. The PIM module would begin to forward the multicast packets, making the Proxy DR operate as the DR. Such embodiments leverage the node-level redundancy of an MC-LAG environment to reduce the convergence time of the network because the Proxy DR is ready to utilize the mroutes of the DR without the need to reestablish mroutes through the PIM graceful restart. In various embodiments, the DR can perform the PIM graceful restart process and, at a certain point, regain control of traffic forwarding from the Proxy DR, resetting the relationship between the peers.

FIG. 1A illustrates an example network 100a in accordance with embodiments of the technology disclosed herein. In various embodiments, the network 100a may run one or more PIM variants, including PIM sparse mode (PIM-SM), PIM dense mode (PIM-DM), bidirectional PIM (Bidir-PIM), and PIM source-specific multicast (PIM-SSM). The PIM standard is called protocol-independent because the PIM standard does not have its own topology discovery mechanism, using the routing information supplied by other routing protocols to identify nodes. In various embodiments, network 100a implements the PIM standard, as well as another routing protocol including, but not limited to: Internet Group Management Protocol (IGMP); Intermediate System to Intermediate System (IS-IS); Open Shortest Path First (OSPF); among other routing protocols.

As illustrated, the network 100a includes an upstream source 102. In the illustrated example, the upstream source 102 is a network router. In other embodiments, the upstream device 102 may be one of the following non-limiting examples: servers; routers; switches; modems; or bridges; among other networking devices. A single upstream device 102 is illustrated for ease of discussion. In various embodiments, the network 100a may include a plurality of upstream devices 102.

Network 100a further includes peer devices 106, 108. In various embodiments, peer devices 106, 108 are configured to work cooperatively within the network. For example, in some embodiments peer devices 106, 108 can be configured to share traffic load by offloading some traffic from one device to the other. Peer devices 106, 108 can also provide node-level redundancy in various embodiments. Node-level redundancy occurs where two or more network devices are configured such that each device is capable of working together to provide connectivity and/or take over operation if one of the other networking devices fail. A non-limiting example is peer device 106, 108 being combined in a MC-LAG. Although explained with reference to MC-LAG, a person of ordinary skill in the art would know, based on the present disclosure, that embodiments of the technology disclosure herein are applicable in any PIM-enabled network topology where two or more network devices (like peer devices 106, 108) are paired together to provide node-level redundancy.

As illustrated in FIG. 1A, the upstream device 102 is connected to the peer devices 106, 108 through MC-LAG_US 104. The MC-LAG_US 104 combines network ports of the upstream device 102 with network ports of each of the upstream interfaces 106a, 108a of the peer devices 106, 108. In various embodiments, the upstream interfaces 106a, 108a may include additional network ports not included within MC-LAG_US 104, enabling each peer device 106, 108 to connect to other upstream devices, such as upstream device 110 connected to upstream interface 106a of peer device 106. In various embodiments, the upstream interface 106a may include virtual interfaces, physical ports, or a combination of both.

Each peer device 106, 108 further includes a PIM module 106c, 108c. The PIM modules 106c, 108c facilitate the PIM functionality in the peer devices 106, 108. In various embodiments, each PIM module 106c, 108c include two route processors (RPs): an active RP and a standby RP. In some embodiments, each PIM module 106c, 108c may include a plurality of RPs. In various embodiments, one of the RPs of PIM module 106c serves as the DR responsible for forwarding PIM data traffic. The DR device is responsible for forwarding all PIM data traffic received by any of the peer devices to downstream clients.

The other peer device 108 may be designated the Proxy DR device by configuring the PIM module 108c to act as a Proxy DR for the PIM module 106c. The Proxy DR serves as a backup for the DR of another device. As discussed above, the Proxy DR has all the functionality as the DR, and can pull the PIM data traffic flowing through the DR. The only difference is that the PIM data traffic forwarding function of the Proxy DR is disabled (e.g., the mroute states are not loaded into the PIM data traffic forwarding hardware of the peer device 108), and all PIM data traffic is handled through the DR. The flow of PIM data traffic through the peer devices 106, 108 is discussed in greater detail with respect to FIGS. 2A-2D.

Although only a PIM module 106c, 108c is illustrated and discussed, each peer device 106, 108 would include a plurality of other components, including processing components (e.g., central processing unit (CPU), ASICs, etc.), memory and computer-readable storage devices, line cards, network interface cards (NICs), etc. A person of ordinary skill in the art would understand the additional hardware and software components for operating a network device, like peer devices 106, 108.

The peer devices 106, 108 communicate over the ICL 118. Using ICL 118, the peer devices 106, 108 maintain synchronization by passing control information between each other. In various embodiments, the information transmitted can include configuration data of the PIM modules 106c, 108c, including the GenID of the active RP of PIM module 106c. The information exchanged includes the mroute states in some embodiments, ensuring that the Proxy DR device has knowledge of the communication paths used to forward PIM data traffic by the DR device. In some embodiments, the information transmitted may also include the shortest path tree (SPT), representing the mroutes in the PIM. Using the SPT and the GenID, peer device 108 can configure PIM module 108c to use the same mroutes in the event of a failure of PIM module 106c, allowing for traffic forwarding to continue faster than waiting on the PIM graceful restart to achieve network convergence.

The synchronization information can be maintained in a respective memory component of peer devices 106, 108. For example, the peer device 108 may store the mroute states, GenID, and other synchronization information in a memory component of peer device 108. Non-limiting examples of memory components for the peer devices 106, 108 include: flash memory, solid state storage devices (SSDs); a storage area network (SAN); removable memory (e.g., memory stick, CD, SD cards, etc.); or internal computer RAM or ROM; among other types of computer storage mediums.

The illustrated network 100a includes a second MC-LAG, MC-LAG_DS 112. As illustrated, MC-LAG_DS 112 includes links between the downstream interfaces 106b, 108b and the downstream device 114. Downstream device 114 can be one of the networking devices discussed with respect to the upstream device 102. A plurality of downstream devices 114 can be included in other embodiments, both connected within MC-LAG_DS 112 or directly connected to one or both of peer devices 106, 108. In various embodiments, the downstream interfaces 106b, 108b are similar to the upstream interfaces 106a, 108a discussed above. The downstream device 114 is connected to clients 116. In various embodiments, one or more clients 116 may be connected directly to one or both of peer devices 106, 108.

Figure 1B:
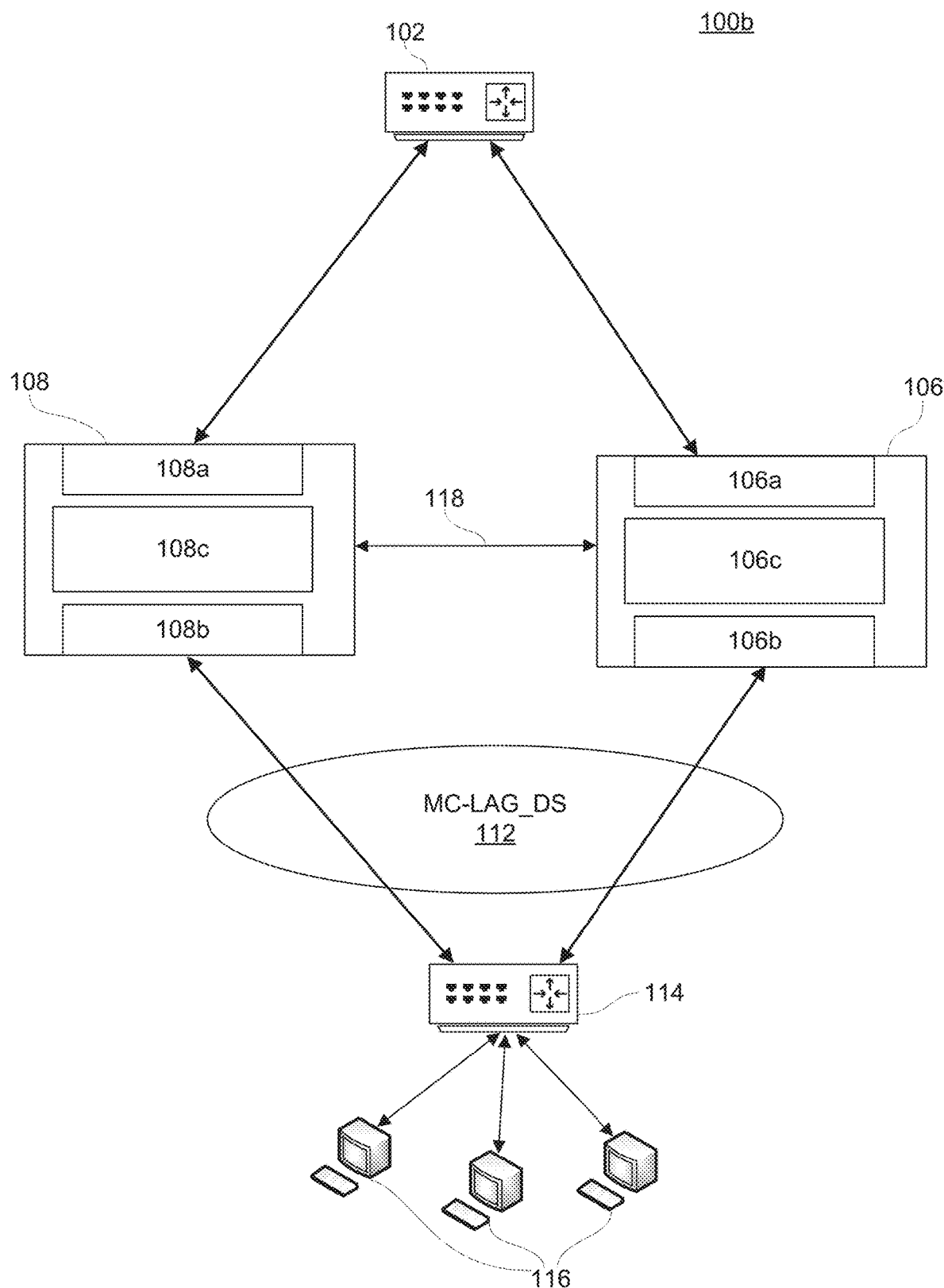
FIG. 1B illustrates another example network in accordance with embodiments of the technology disclosed herein.

Although the upstream is illustrated with an MC-LAG (MC-LAG_US 104), in other embodiments the upstream connections may not be in an MC-LAG configuration. FIG. 1B illustrates another example network 100b in accordance with embodiments of the present disclosure. As illustrated, network 100b includes discrete communication links between the upstream device 102 and the peer device 106, 108. Where the upstream connection is not arranged as an MC-LAG, the upstream device 102 transmits a copy of the PIM data traffic to each of the peer devices 106, 108. Therefore, both peer devices would receive the PIM data traffic, but only peer device 106 (the DR device as discussed with respect to FIG. 1A) would have the responsibility to forward the PIM data traffic to downstream device 114; peer device 108 (the Proxy DR device) would simply receive the PIM data traffic and not forward it.

Figure 2A:
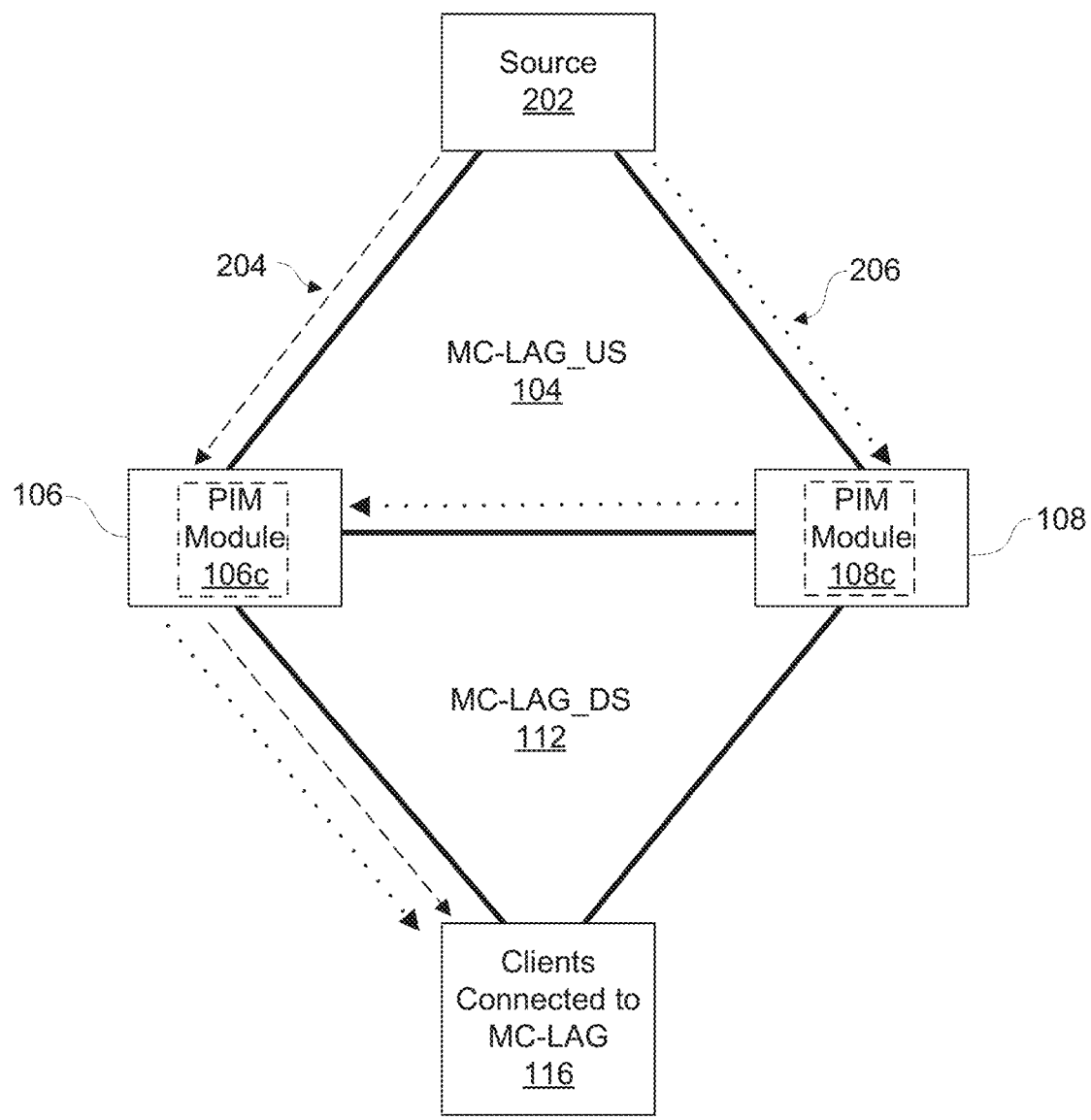
FIG. 2A illustrate operation of an MC-LAG with PIM functionality while the DR device is active in accordance with embodiments of the technology disclose herein.
Figure 2B:
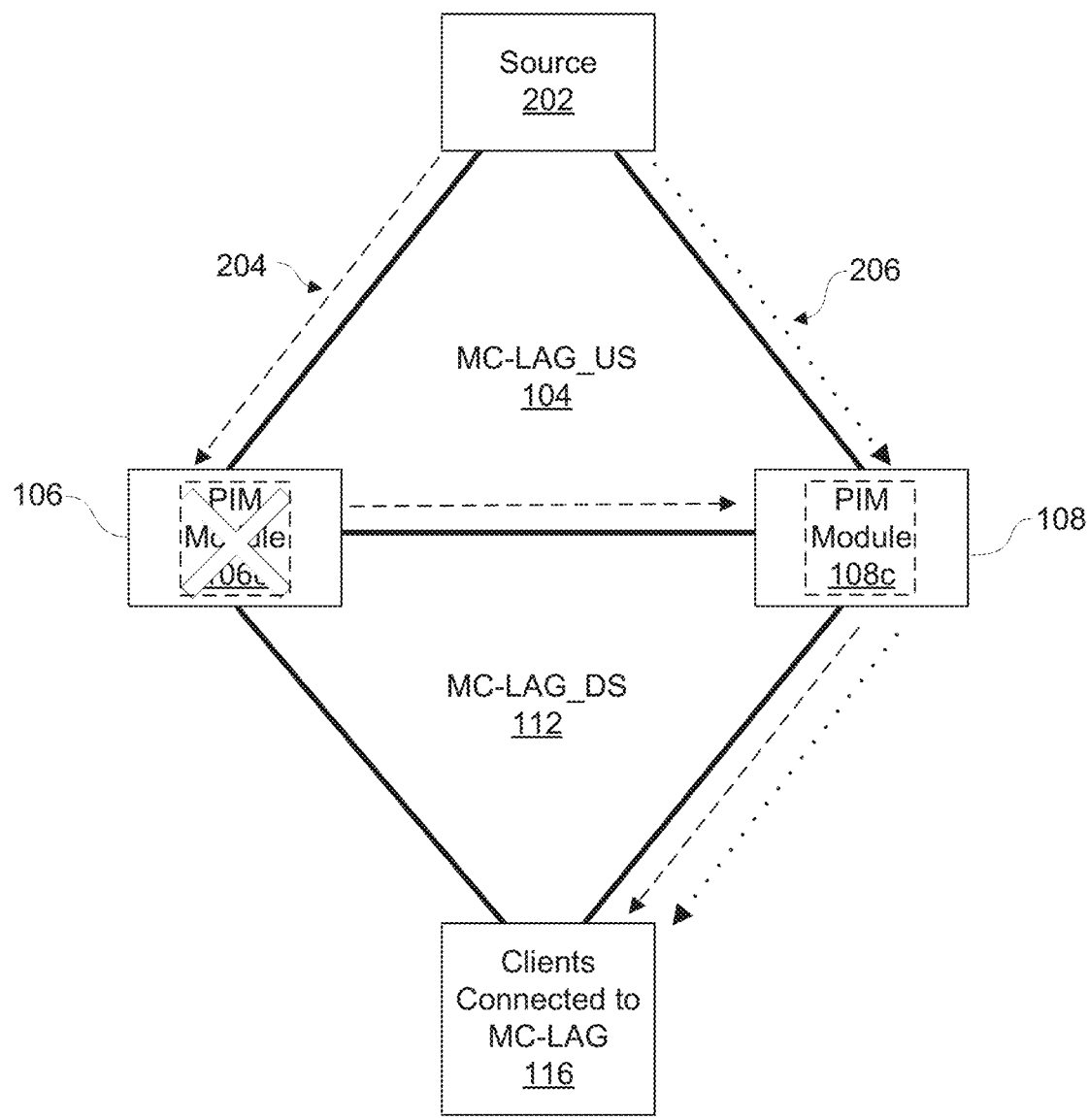
FIG. 2B illustrate operation of an MC-LAG with PIM functionality during an active RP failure in accordance with embodiments of the technology disclose herein.

FIGS. 2A and 2B illustrate operation of an MC-LAG with PIM functionality while the DR device is active and during an active RP failure, respectively, in accordance with embodiments of the technology disclosed herein. In FIGS. 2A and 2B, the connections between devices discussed with respect to FIG. 1A are represented as solid lines. Referring to FIG. 2A, a source 202 is connected with the DR device 106 and the Proxy DR device 108 in MC-LAG_US 104. Accordingly, the source 202 is communicatively coupled to the PIM modules 106c, 108c of the DR device 106 and the Proxy DR device 108, respectively In various embodiments, source 202 can be the upstream device 102 illustrated in FIG. 1A.

When the PIM module 106c of the DR device 106 is operating at steady state (i.e., the active RP of the PIM module 106c is functioning), it is responsible for performing all data forwarding of PIM data traffic in the MC-LAG_US 104 and MC-LAG_DS 112. As illustrated, source 202 communicates first multicast data 204 to one or more network interfaces of DR device 106 and second multicast data 206 to one or more network interfaces of Proxy DR device 108. As PIM module 106c is the DR and has the responsibility of forwarding PIM data traffic, the second multicast data 206 is replicated to the DR device 106. In various embodiments, the second multicast data 206 is replicated to the DR device 106 and exchanged over the ICL between the peer devices 106, 108, like the ICL 118 discussed with respect to FIG. 1A. After receiving the replicated second multicast data 206, the DR device 106 forwards both the first multicast data 204 and the replicated second multicast data 206 to the one or more clients connected to the MC-LAG 116, like the clients 116 discussed with respect to FIG. 1A, using the PIM module 106c. In various embodiments, DR device 106 may forward the first multicast data 204 and the replicated second multicast data 206 to a downstream device, such as the downstream device 114 discussed with respect to FIG. 1A, using the PIM module 106c. In some embodiments, the DR device 106 can transmit using the PIM module 106c the first multicast data 204 and the replicated second multicast data 206 to a network device configured to act as a rendezvous point in a PIM network, through which other downstream devices 114 and clients 116 can connect to the MC-LAG_DS 112.

When PIM module 106c fails, either because of a failure of the active RP or of the PIM module 106c itself, FIG. 2B illustrates an example PIM-DR failover process in accordance with embodiments of the present disclosure. As discussed above, in situations where a failure occurs with respect to the PIM module serving as the DR (PIM module 106c of DR device 106) the other components of the DR device 106 may remain operational, making full implementation of the traditional peer failover process detrimental to the functioning of the network. To avoid this issue, embodiments of the present disclosure provide a bypass of this issue by identifying a PIM-related failure and triggering a PIM-DR failover in the PIM module 108c of the Proxy DR device 108. As illustrated in FIG. 2B, when the PIM module 106c fails, the Proxy DR device 108 takes over the PIM data traffic forwarding duties of the DR device 106 by activating the PIM module 108c. Through synchronization, Proxy DR device 108 has knowledge of the mroutes established by the formerly active RP of PIM module 106c. Accordingly, when a PIM-related failure occurs on DR device 106, the Proxy DR device 108 is capable of loading the mroutes into the forwarding hardware (e.g., packet forwarding ASIC, etc.), immediately reestablishing the mroute states and continuing PIM data traffic forwarding on the newly active RP of PIM module 108c.

Inverse of the operation discussed with respect to FIG. 2A, data traffic replication now flows from the DR device 106 to the Proxy DR device 108 in FIG. 2B. In various embodiments, the replication may occur of the ICL, with the replicated first multicast data 204 sent to the Proxy DR device 108. The Proxy DR device 108 then forwards, using the PIM module 108c, the replicated first multicast data 204 and the second multicast data 206 to the clients connected to the MC-LAG 116, similar to the data forwarding discussed with respect to FIG. 2A. In various embodiments, DR device 106 remains operational and continues to the perform other non-PIM traffic responsibilities and/or the PIM graceful restart process.

Figure 2C:
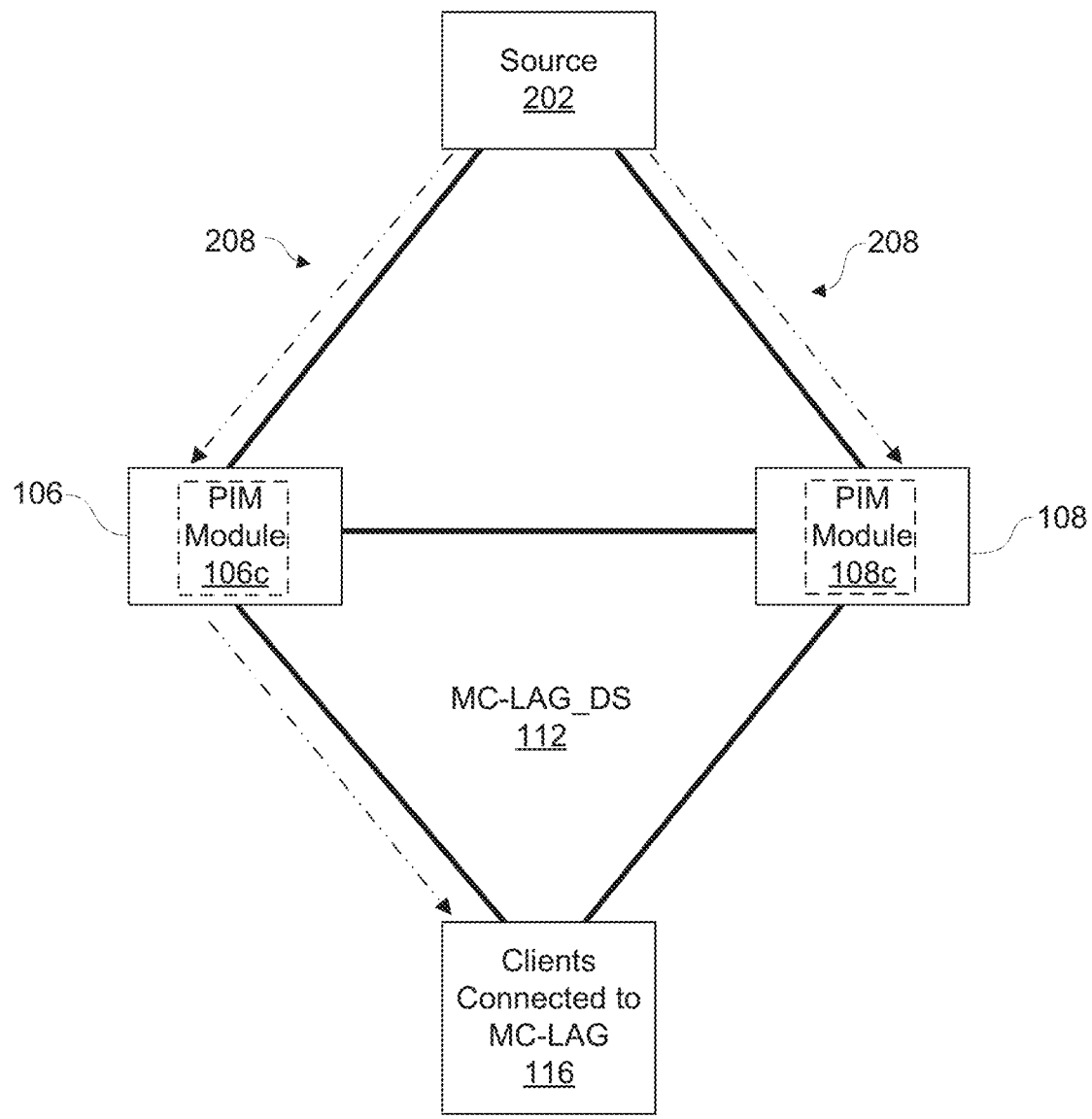
FIG. 2C illustrate operation of a node-level redundant network with PIM functionality while the DR device is active in accordance with embodiments of the technology disclose herein.
Figure 2D:
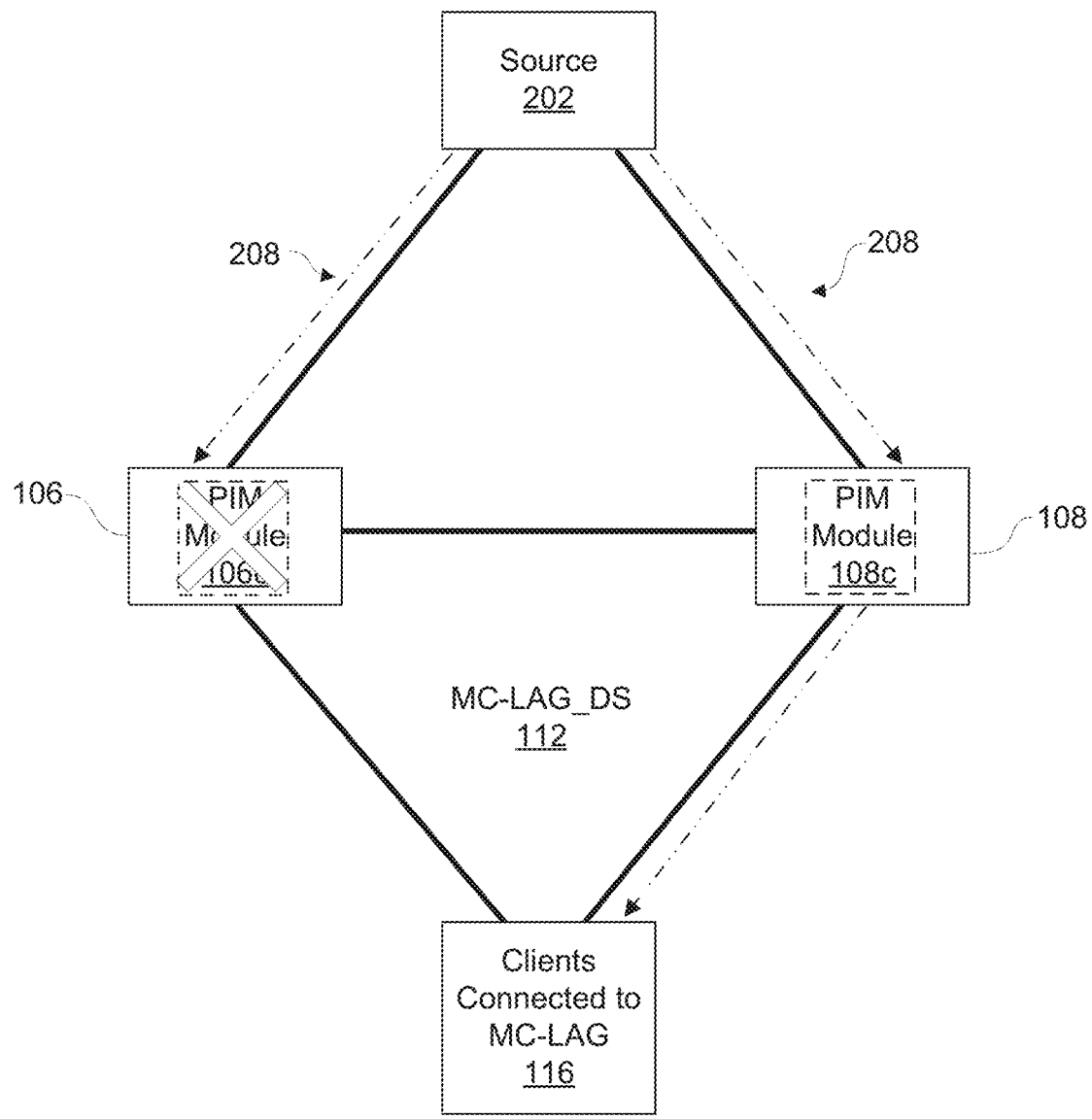
FIG. 2D illustrate operation of a node-level redundant network with PIM functionality during an active RP failure in accordance with embodiments of the technology disclose herein.

FIGS. 2C and 2D illustrate operation of a node-level redundant network with PIM functionality while the DR device is active and during an active RP failure, respectively, in accordance with embodiments of the technology disclosed herein. As with FIGS. 2A and 2B, the solid lines represent the connections between the devices discussed with respect to FIG. 1B. Referring to FIG. 2C, the source 202 is not configured in an MC-LAG, but instead has independent network connections to both the DR device 106 and the Proxy DR device 108, the source being communicatively coupled to the PIM modules 106c, 108c. As the interfaces of the source 202 are not combined through LA, the source 202 communicates the multicast data 208 to both the DR device 106 and the Proxy DR device 108. In various embodiments, source 202 can be the upstream device 102 illustrated in FIG. 1A.

During steady state operation of the DR device 106 (i.e., the active RP of the PIM module 106c is functioning), it is responsible for forwarding the PIM data traffic received from source 202. The DR device 106 forwards the multicast data 208 to the one or more clients 116 connected to the MC-LAG_DS 112, like the clients 116 discussed with respect to FIGS. 1A and 1B, using the PIM module 106c. In various embodiments, DR device 106 may forward the multicast data 208 to a downstream device, such as the downstream device 114 discussed with respect to FIGS. 1A and 1B, using the PIM module 106c. Although the Proxy DR device 108 also receives the multicast data 208, the Proxy DR device 108 does not forward any of the data. In various embodiments, the Proxy DR device 108 may store the received multicast data 208 in a memory component of the Proxy DR device 108. In some embodiments, the Proxy DR device 108 may disregard the received multicast data 208. When PIM module 106c fails, either because of a failure of the active RP or of the PIM module 106c itself, FIG. 2D illustrates an example PIM-DR failover process in accordance with embodiments of the present disclosure.

As discussed above, in situations where a failure occurs with respect to the PIM module serving as the DR (PIM module 106c of DR device 106) the other components of the DR device 106 may remain operational, making full implementation of the traditional peer failover process detrimental to the functioning of the network. To avoid this issue, embodiments of the present disclosure provide a bypass of this issue by identifying a PIM-related failure and triggering a PIM-DR failover in the PIM module 108c of the Proxy DR device 108. As illustrated in FIG. 2D, when the PIM module 106c fails, the Proxy DR device 108 takes over the PIM data traffic forwarding duties of the DR device 106 by activating the PIM module 108c. Through synchronization, Proxy DR device 108 has knowledge of the mroutes established by the formerly active RP of PIM module 106c. Accordingly, when a PIM-related failure occurs on DR device 106, the Proxy DR device 108 is capable of loading the mroutes into the forwarding hardware (e.g., packet forwarding ASIC, etc.), immediately reestablishing the mroute states and continuing PIM data traffic forwarding on the newly active RP of PIM module 108c. As the source 202 also communicates the multicast data 208 to the Proxy DR device 108, it can immediately begin to forward the multicast data 208 over the mroutes. In various embodiments, DR device 106 remains operational and continues to the perform other non-PIM traffic responsibilities and/or the PIM graceful restart process.

By handing the responsibility for forwarding PIM data traffic to the Proxy DR device 108, embodiments of the present disclosure can greatly reduce the convergence time of the network. Where the failure is a failure of the active RP of PIM module 106c, the PIM module 106c can go through the PIM graceful restart process as it would under the PIM standard, while PIM data traffic forwarding can be quickly established on PIM module 108c of the Proxy DR device 108. By triggering a node-level-type failover to occur solely for the PIM modules, embodiments of the technology of the present disclosure allow for faster convergence by leveraging the synchronized nature of the peer relationship between the DR device 106 and the Proxy DR device 108.

By utilizing this PIM-DR failover, the PIM module 106c can go through the PIM graceful restart process without an excessive downtime occurring where PIM data traffic is lost. The PIM module 108c would become the designated router and will be responsible for forwarding all PIM data traffic received by the DR device and the Proxy DR device. In various embodiments, in response to receiving an indication of a PIM-related failure from the DR device 106, the Proxy DR device 108 may send an acknowledgment message to the DR device 106. The acknowledgment message would inform the DR device 106 that the Proxy DR device 108 is taking over responsibility for PIM data traffic forwarding. Upon receiving the acknowledgment message, the DR device 106 would disable its PIM data forwarding function while the PIM module 106c goes through the PIM graceful restart process. Essentially, the DR device 106 and the Proxy DR device 108 switch roles within the network—the Proxy DR device 108 becomes the designated router for PIM data traffic forwarding, and the DR device 106 becomes the proxy device.

In various embodiments, the acknowledgment message may be a PIM Hello message from the Proxy DR device 108 with a high priority. Upon receiving the high priority Hello message from the Proxy DR device 108, the DR device 106 would understand that the Proxy DR device 108 is taking control of PIM data traffic forwarding going forward, and the DR device 106 would disable its PIM-related forwarding function. In other embodiments, the acknowledgment message may be a acknowledgment signal sent to the DR device 106 from the Proxy DR device 108, telling the DR device 106 that it is no longer responsible for forwarding PIM-related data. In response, the DR device 106 would disable its PIM-related forwarding function.

In various embodiments, responsibility for forwarding PIM-related data traffic may be transferred back to the DR device 106. Although the Proxy DR device 108 can continue to the forward the PIM-related data traffic, some network administrators may want to have responsibility returned to the DR device 106 for various reasons, such as easier network management or device design, among others. In such embodiments, the DR device 106 may generate a ready message, indicating that the PIM module 106c is prepared to resume operating as the designated router. In various embodiments, the DR device 106 may generate a ready message to send to the Proxy DR device 108. The ready message may be a PIM Hello message with a high priority, similar to the PIM Hello message discussed above with respect to the Proxy DR device 108, while in other embodiments the ready message may be a ready signal informing the Proxy DR device 108 to cease forwarding PIM-related data. Upon receiving the ready message, the Proxy DR device 108 may terminate PIM data forwarding by removing the mroutes loaded in the forwarding hardware.

In various embodiments, the PIM module 106c may be ready to resume operating as the designated router after a threshold. In various embodiments, the threshold may be a certain number of mroutes reestablished between the PIM module 106c and the neighbor devices. In other embodiments, the threshold may be a certain percentage of mroutes reestablished by the PIM module 106c. In still other embodiments, the threshold may be a timer, after which the ready message is triggered. In various embodiments, the value of the threshold may be determined based on the number of traffic flows connected to the DR device 106.

Figure 3:
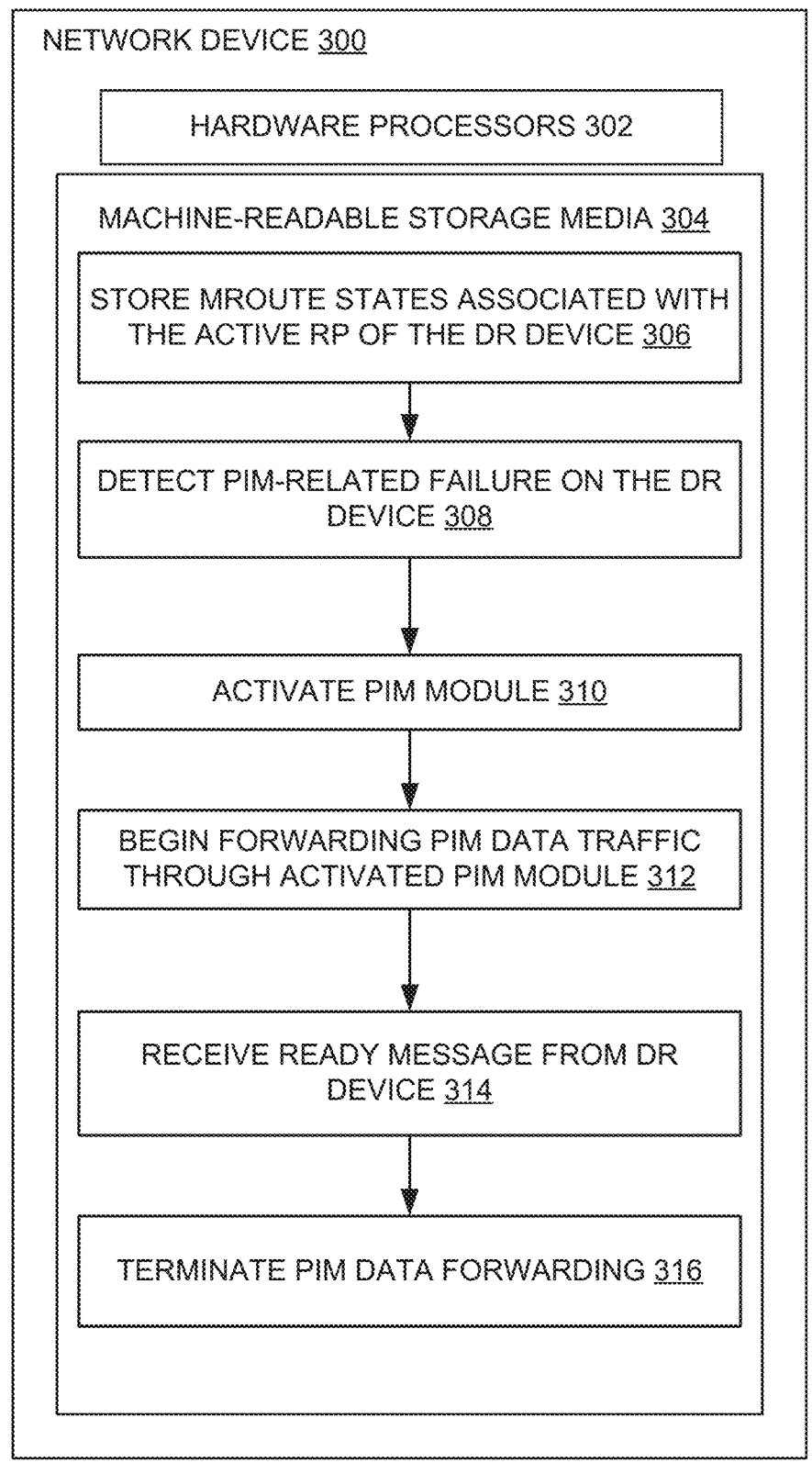
FIG. 3 illustrates an example method for PIM-DR failover in accordance with various embodiments of the technology disclosed herein.

FIG. 3 is an example network device 300 serving as the Proxy DR device to perform a PIM-DR failover in accordance with embodiments of the present disclosure. With respect to FIG. 3, it is assumed that the network device 300 is part of a peer device configuration, similar to the configuration discussed with respect to FIGS. 1A, 1B, 2A, 2B, 2C, and 2D. Where operations and functionality of network device 300 are similar to those discussed with respect to FIGS. 1A, 1B, 2A, 2B, 2C, and 2D, the description should be interpreted to apply. In various embodiments, the network device 300 may be similar to the Proxy DR device (peer device) 108 discussed with respect to FIGS. 1A, 1B, 2A, 2B, 2C, and 2D. Network device 300 includes hardware processors 302. In various embodiments, hardware processors 302 may be similar to the processors discussed above with respect to FIGS. 1A and 1B. In various embodiments, hardware processors 302 may include one or more processors.

Hardware processors 302 are configured to execute instructions stored on a machine-readable medium 304. Machine readable medium 304 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 304 may include various sub-instructions for performing the function embodied by the identified functions. For example, the instruction "Store Mroute States Associated With the Active RP of the DR Device" 306 may include various sub-instructions for storing the mroutes received from the DR device in a memory component of the Proxy DR device. The mroute states may be stored in a manner similar to the memory storage discussed with respect to FIGS. 1A, 1B, 2A, 2B, 2C, and 2D.

The instruction "Detect PIM-Related Failure on the DR Device" 308 may include various sub-instructions for receiving and identifying one or more types of signals indicating a PIM-related failure from the DR device. A PIM-related failure may comprise a failure of the active RP of the PIM module acting as the DR, or a failure related to the PIM module itself. In various embodiments, a PIM-related failure may be detected when a PIM Hello message with a new GenID is received by one or more Proxy DR devices. A PIM Hello message with a new GenID signals that the DR has entered the PIM graceful restart process and is attempting to reestablish the mroute states using the standby RP of the DR PIM module. A Proxy DR device can identify a PIM-related failure based on the presence of the new GenID and, in response, the Proxy DR device can send a PIM-DR failover event notification to its PIM module.

In some embodiments, a PIM-related failure may be detected through receipt of a PIM failure signal generated by the DR PIM module or the DR device. The PIM failure signal may be triggered when the DR device identifies the PIM module has entered into a PIM graceful restart state in some embodiments, while in others the PIM failure signal may be triggered when a processor of the DR device configured to control operation of the DR PIM module losses communication with the PIM module. In various embodiments, the PIM failure signal may indicate that a PIM-related failure has occurred. In some embodiments, the PIM failure signal may describe the nature of the failure (e.g., active RP failure, module failure, etc.). In some embodiments, the PIM failure signal and the PIM Hello message may be the same message.

In some other embodiments, a PIM-related failure may be detected by use of a status check message sent from the one or more Proxy DR device to the DR device. A status check message can query the DR device as to the status of the PIM module of the DR device. Failure by the DR device to respond to the status check message, or a response indicating failure to reach the PIM module, could indicate an issue with the PIM module of the DR device. In some embodiments, the DR device may indicate an issue with the PIM module through the DR device's response to the status check message, the response being similar to the PIM failure signal discussed above.

In various embodiments, one or more of the detection methods discussed herein may be implemented to ensure that a PIM-related failure is detected and the PIM-DR failover can take place.

In various embodiments, the one or more Proxy DR devices may detect the PIM-related failure over the ICL.

The instruction "Activate PIM Module" 310 may include sub-instructions to activate the PIM module of the network device 300. In various embodiments, activating the PIM module of the Proxy DR device includes obtaining the mroutes used by the formerly active RP of the DR device's PIM module. Through the nature of the peer relationship of DR device and the Proxy DR device, the Proxy DR device maintains a copy of the mroute states as used by the formerly active RP of the DR device (in addition to replicas of PIM data traffic sent directly to the DR device by one or more sources). In various embodiments, the mroute states may be maintained on a memory component of the Proxy DR device, and activation may comprise retrieving the mroute states and loading the mroute states into the forwarding hardware of the PIM module. In some embodiments, the PIM module may have its own dedicated physical memory component to maintain the mroute states, or a dedicated portion of the Proxy DR device memory may be allocated to the PIM module and the mroute states information is stored there.

Where only one Proxy DR device is peered with the DR device, the PIM module of the Proxy DR device will activate upon a detected PIM-related failure in the DR device. In embodiments where two or more Proxy DR devices are peer devices to the DR device, each Proxy DR device may be priority ranked, identifying which Proxy DR device is to activate upon a PIM-related failure in the DR device, which Proxy DR device is to activate upon a PIM-related failure in the first activated Proxy DR device, etc. In some embodiments, the DR device and the Proxy DR devices may be configured in a series, with only the subsequent peer device configured to detect a PIM-related failure in the previous peer device. In some embodiments, the DR device may be configured to send the PIM Hello message and/or a PIM failure signal only to one of the Proxy DR devices.

In various embodiments, the network device 300 includes sub-instructions to send an acknowledgment message to the DR device. The acknowledgment message may be similar to the acknowledgment message discussed above. In various embodiments, the acknowledgment message may be a PIM Hello message from the network device 300 with a high priority. Upon receiving the high priority Hello message from the network device 300, the DR device would understand that the network device 300 is taking control of PIM data traffic forwarding going forward, and the DR device would disable its PIM-related forwarding function. In other embodiments, the acknowledgment message may be an acknowledgment signal sent to the DR device from the network device, telling the DR device that it is no longer responsible for forwarding PIM-related data. In response, the DR device would disable its PIM-related forwarding function.

The instruction "Begin Forwarding PIM Data Traffic Through Activated PIM Module" 312 may include sub-instructions to forward PIM data traffic.

In various embodiments the network device 300 optionally may be configured to transfer responsibility to forward PIM data traffic back to the DR device upon receipt of a ready message from the DR device. The instruction "Receive Ready Message From the DR Device" 314 may include sub-instructions to identify receipt of a receive message from the DR device. The ready message may be a PIM Hello message with a high priority, similar to the PIM Hello message discussed above with respect to the "Activate PIM Module" 310 sub-instruction, while in other embodiments the ready message may be a ready signal informing the Proxy DR device 108 to cease forwarding PIM-related data. In some embodiments, the network device 300 may include sub-instructions to transfer responsibility back to the DR device immediately upon receiving the ready message from the DR device. In still other embodiments, the network device 300 may decide whether to transfer responsibility back to the DR device based on a plurality of factors, including current bandwidth usage and availability, types of traffic classes, state of destination clients, and other network performance metrics.

The instruction "Terminate PIM Data Forwarding" 316 may include sub-instructions for terminating the PIM data traffic forwarding function of the network device 300. In various embodiments, terminating forwarding may comprise removing the mroute states loaded in the forwarding hardware of the network device 300. In some embodiments, the network device 300 may include sub-instructions to transfer responsibility back to the DR device immediately upon receiving the ready message from the DR device. In still other embodiments, the network device 300 may decide whether to transfer responsibility back to the DR device based on a plurality of factors, including current bandwidth usage and availability, types of traffic classes, state of destination clients, and other network performance metrics.

By implementing embodiments in accordance with the example method of 300, the convergence time within a PIM network with node-level redundant-type configurations (e.g., MC-LAG peer devices) may be greatly reduced. The PIM graceful restart process no longer dictates when full data forwarding capacity is accomplished, as data forwarding using the same mroute static states is continued by a Proxy DR device. Minimal interruption in multicasting traffic is achieved. Moreover, the benefits of the PIM graceful restart process are still achieved without the limitation regarding convergence time. This results in a great improvement to the functioning of the networking devices within a PIM-enabled network.

Figure 4:
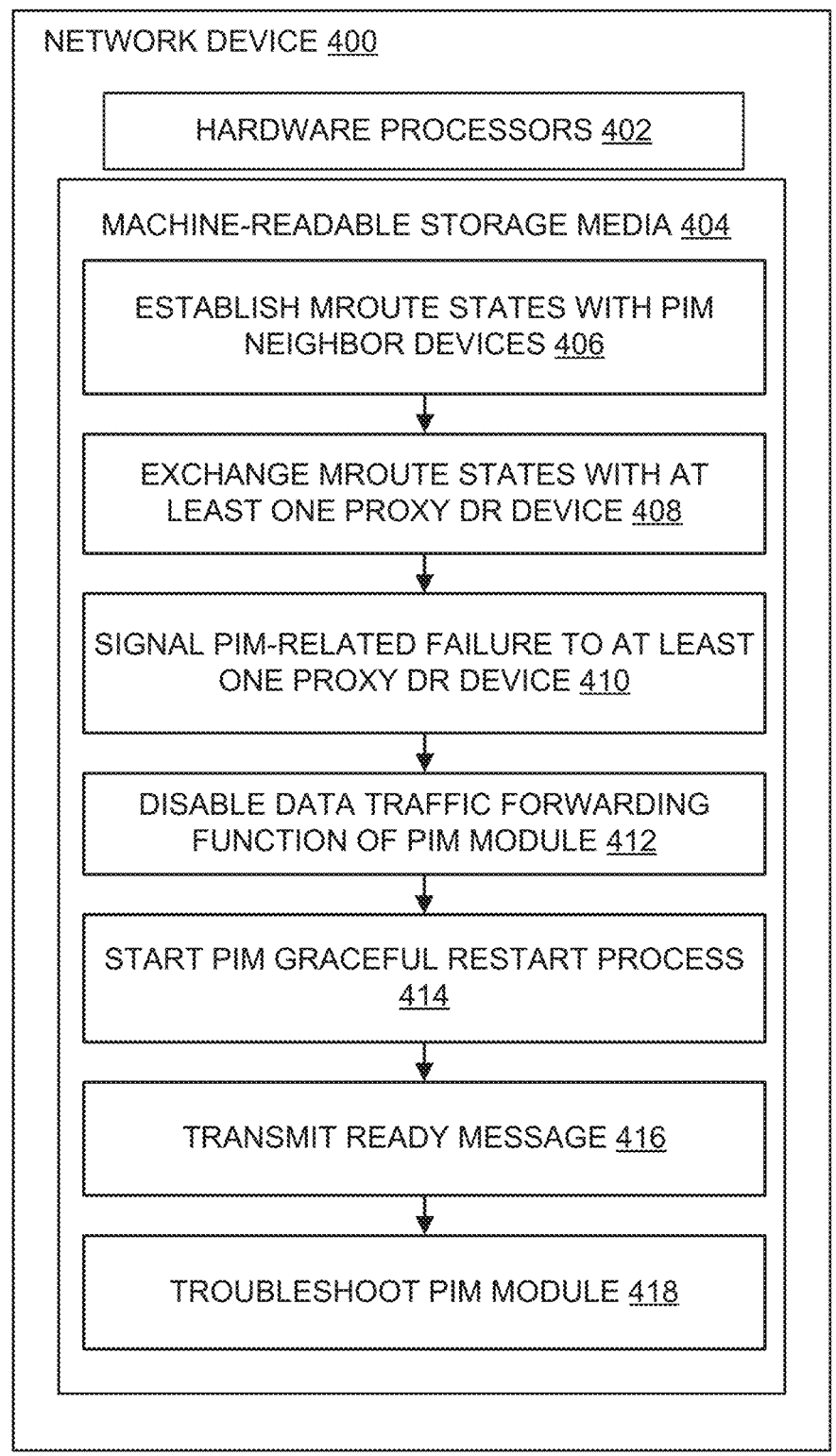
FIG. 4 illustrates an example method of PIM-DR failover from the perspective of a network device serving as the Proxy DR device in accordance with embodiments of the technology disclosed herein.

FIG. 4 is an example network device 400 serving as the DR device to perform a PIM-DR failover in accordance with embodiments of the present disclosure. With respect to FIG. 4, it is assumed that the network device is part of a peer device configuration, similar to the configuration discussed with respect to FIGS. 1A-4. Where operations functionality of network device 400 are similar to those discussed with respect to FIGS. 1A, 1B, 2A, and 2B, the description should be interpreted to apply. Network device 400 includes hardware processors 402. In various embodiments, hardware processors 402 may be similar to the processors discussed above with respect to FIGS. 1A and 1B. In various embodiments, hardware processors 402 may include one or more processors.

Hardware processors 402 are configured to execute instructions stored on a machine-readable medium 404. Machine readable medium 404 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 404 may include various sub-instructions for performing the function embodied by the identified functions.

For example, the instruction "Establish Mroute States With PIM Neighbor Devices" 406 may include various sub-instructions for establishing mroutes in accordance with the PIM standard between the network device 400 and devices within the PIM-enabled network. The mroute states are associated with the active RP of the DR device in some embodiments.

The instruction "Exchange Mroute States with At Least One Proxy Device" 408 may include exchanging information to synchronize peer devices. In various embodiments, the mroute states may be exchanged through an ICL, as described with respect to FIGS. 1A, 1B, 2A, and 2B.

The instruction "Signal PIM-Related Failure to At Least One Proxy DR Device" 410 may include sub-instructions to generate one or more signals. The signaling of a PIM-related failure may be done in a similar manner to that described with respect to operation 308 of FIG. 3. In various embodiments, the DR device may determine the nature of the failure, as discussed with respect to FIG. 3.

The instruction "Disable Data Traffic Forwarding Function of PIM Module" 412 may include sub-instructions to receive an acknowledgment message from the Proxy DR Device. In various embodiments, the acknowledgment message may be similar to the acknowledgment message discussed above with respect to FIG. 3. In response to receiving the acknowledgment message, the network device 400 would disable its PIM-related forwarding function. In various embodiments, disabling the forwarding function may comprise the network device 400 removing the mroutes from the forwarding hardware of the network device 400.

The instruction "Start PIM Graceful Restart Process" 414 may include sub-instructions to trigger the PIM graceful restart functionality. The PIM graceful restart process is performed in accordance with the PIM standard in various embodiments.

The instruction "Transmit Ready Message" 316 may include sub-instructions for generating a ready message to send to the Proxy DR device. The ready message may be similar to the ready message discussed above with respect to FIG. 3. In some embodiments, transmitting the ready message may be triggered based on a threshold, such as the threshold discussed above with respect to FIG. 3.

The instruction "Troubleshoot PIM Module" 418 may include sub-instructions for performing various troubleshooting procedures. In various embodiments, troubleshooting the PIM module may comprise recycling power to the PIM module, resetting one or more hardware or software processors of the PIM module, or other troubleshooting techniques.

Using the embodiments of the technology disclosed herein, the benefits of both using the PIM protocol (to enable multicasting) and node-level redundancy network device configurations (e.g., MC-LAG) can be realized in situations where only a PIM-related failure occurs in a peer device, but is otherwise operational. The PIM-DR failover technology disclosed herein enables network designers to greatly reduce the impact of the PIM graceful restart process on the convergence time of a network.

Although the technology disclosed herein has used an MC-LAG configuration to assist in understanding the subject matter, a person of ordinary skill in the art would understand that the technology is applicable in network without any MC-LAG configurations. The technology is applicable to any network configuration providing node-level redundancy to enable the standby network device to take over the PIM-related responsibilities during a PIM-related failure on the main network device. Where only the PIM module suffers a failure, the device failover function of a traditional node-level redundancy configuration would not be triggered, meaning the network would not converge (and PIM data traffic would not be forwarded) until the completion of a PIM graceful restart, which greatly increases as the number of network connections increases. For example, with reference to FIGS. 2A-2D, a person of ordinary skill in the art would know that the downstream connections could be independent connections (i.e., not arranged in MC-LAG_DS 112), each having a separate connection to the DR device 106 and the Proxy DR device 108.

Figure 5:
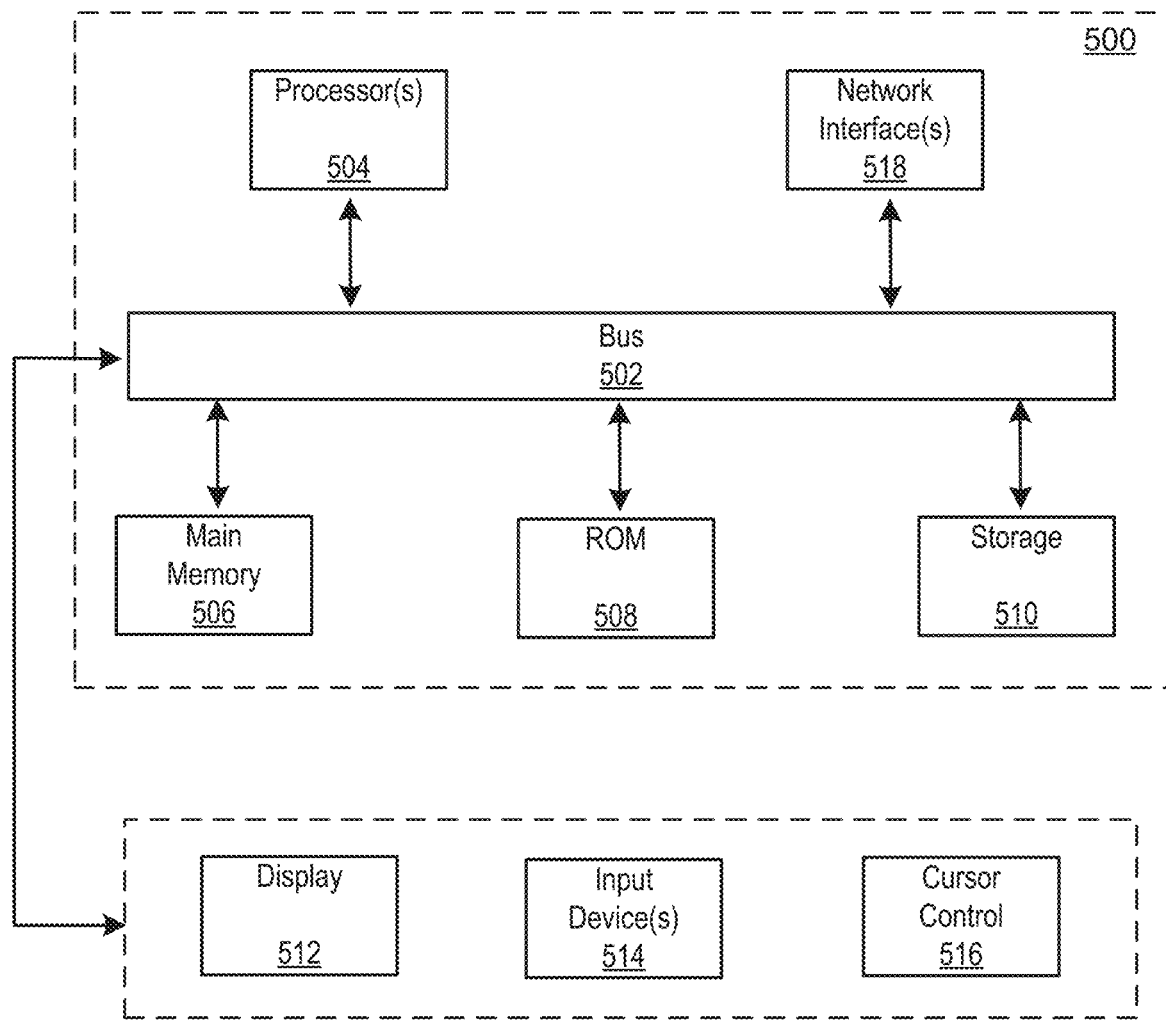
FIG. 5 illustrates an example method of PIM-DR failover from the perspective of a network device serving as the DR device in accordance with embodiments of the technology disclosed herein.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A first network device, comprising:
   a processor;
   a memory;
   the processor configured to execute a protocol-independent multicast (PIM) process, the PIM process being configured to operate in a same manner as a PIM process module of a second network device except that a PIM data traffic forwarding function of the PIM process of second network device is inactive;
   the processor configured to execute a PIM designated router (PIM-DR) failover process by:
      storing on the memory a plurality of multicast route states associated with the PIM process of the second network device;
      detecting a PIM-related failure on the PIM process of the second network device;
      activating the PIM data traffic forwarding function of the PIM process of the first network device; and
      forwarding PIM data traffic through the PIM process of the first network device;
   wherein one or more other networking components of the second network device remain in a functional state and only the PIM process of the first network device is affected by the detection of the PIM-related failure on the PIM process of the second network device.

2. The first network device of claim 1, detecting a PIM-related failure comprising receiving a PIM failure signal from the second network device, the PIM failure signal indicative of the PIM-related failure.

3. The first network device of claim 1, detecting a PIM-related failure comprising:
   receiving a PIM Hello message from the PIM process of the second device;
   identifying a generation identifier (GenID) value in the PIM Hello message; and
   comparing the received GenID value with an original GenID value associated with the plurality of multicast route states stored in the memory.

4. The first network device of claim 1, activating the PIM data traffic forwarding function comprising:
   retrieving the plurality of multicast route states stored in the memory; and
   loading the plurality of multicast route states into a forwarding hardware of the first network device.

5. The first network device of claim 1, activating the PIM data traffic forwarding function comprising sending a PIM-DR failover event notification to the PIM process of the first network device.

6. The first network device of claim 1, wherein the first network device and the second network device are configured as a multi-chassis link aggregation group (MC-LAG).

7. The first network device of claim 1, the processor further configured to execute a PIM-DR failover process by:
   receive a ready message from the DR device, the ready message indicating that the DR device is ready.

8. The first network device of claim 7, wherein the processor is further configured to execute a PIM-DR failover process by terminating the PIM data traffic forwarding function of the PIM process of the first network device upon receiving the ready message from the second network device.

9. The first network device of claim 7, wherein the first network device is configured to ignore the ready message from the second network device and continue to forward PIM data traffic.

10. The first network device of claim 1, the processor further configured to execute a PIM-DR failover process by:
    sending an acknowledgment message to the second device, wherein the acknowledgment message comprises a PIM Hello message with high priority.

11. The first network device of claim 1, wherein the first network device is configured to exchange a copy of a first set of PIM data traffic received through an interface component of the first network device prior to detecting a PIM-related failure.

12. A method of protocol-independent multicast designated router (PIM-DR) failover, comprising:
    designate a PIM process of a first network device of a multi-chassis link aggregation group (MC-LAG) as a designated router responsible for forwarding all PIM data traffic in the MC-LAG, the PIM process of the first network device having an active route processor;
    designate a PIM process of a second network device of the MC-LAG as a proxy designated router, wherein the PIM process of the second network device is configured to operate in a same manner as the PIM process of the first network device except that a PIM data traffic forwarding function of the PIM process of the second network device is inactive;
    exchanging from the first network device to the second network device, over an interchassis link (ICL), information describing a plurality of multicast route states between an active route processor of the PIM process of the first network device and a plurality of neighbor network devices;
    storing, in a memory of the second network device, the information describing the plurality of multicast route states from the first network device;
    detecting, by the second network device, a PIM-related failure on the first network device;
    disabling a PIM data traffic forwarding function of the PIM process of the first network device; and
    activating, by the second network device, the PIM data traffic forwarding function of the PIM process of the second network device by sending a PIM-DR event message to the PIM process of the second network device;
    wherein one or more other networking components of the first network device remain in a functional state and only the PIM process of the second network device is affected by the PIM-DR event message.

13. The method of claim 12, detecting a PIM-related failure comprising:
    receiving a PIM Hello message from the PIM process of the first network device;
    identifying a generation identifier (GenID) value in the PIM Hello message; and
    comparing the received GenID value with an original GenID value used to establish the plurality of multicast route states, the information describing the plurality of multicast route states including the original GenID.

14. The method of claim 13, further comprising:
    performing, by the PIM process of the first network device, a PIM graceful restart process to establish a plurality of multicast route states using a standby route processor of the PIM process of the first network device; and sending, by the first network device, to the second network device a ready message indicting the first network device is prepared to resume forwarding PIM data traffic, the ready message being triggered when a timer expires.

15. A non-transitory machine-readable storage medium encoded with instructions, the instructions executable by a processor of a system to cause the system to:
designate a PIM process of a first network device of a multi-chassis link aggregation group (MC-LAG) as a designated router responsible for forwarding all PIM data traffic in the MC-LAG, the PIM process of the first network device having an active route processor;
designate a PIM process of a second network device of the MC-LAG as a proxy designated router, wherein the PIM process of the second network device is configured to operate in a same manner as the PIM process of the first network device except that a PIM data traffic forwarding function of the PIM process of the second network device is inactive;
exchange from the first network device to the second network device, over an interchassis link (ICL), information describing a plurality of multicast route states between an active route processor of the PIM process of the first network device and a plurality of neighbor network devices;
store, in a memory of the second network device, the information describing the plurality of multicast route states from the first network device;
detect, by the second network device, a PIM-related failure on the first network device;
disable a PIM data traffic forwarding function of the PIM process of the first network device; and
activate, by the second network device, the PIM data traffic forwarding function of the PIM process of the second network device by sending a PIM-DR event message to the PIM process of the second network device;

wherein one or more other networking components of the first network device remain in a functional state and only the PIM process of the second network device is affected by the PIM-DR event message.

16. The non-transitory machine-readable storage medium of claim 15, wherein detecting a PIM-related failure comprises receiving a PIM failure signal from the second network device, the PIM failure signal indicative of the PIM-related failure.

17. The non-transitory machine-readable storage medium of claim 15, wherein, detecting a PIM-related failure comprises:
receiving a PIM Hello message from the PIM process of the second device;
identifying a generation identifier (GenID) value in the PIM Hello message; and
comparing the received GenID value with an original GenID value associated with the plurality of multicast route states stored in the memory.

18. The non-transitory machine-readable storage medium of claim 15, wherein activating the PIM data traffic forwarding function comprises:
retrieving the plurality of multicast route states stored in the memory; and
loading the plurality of multicast route states into a forwarding hardware of the first network device.

19. The non-transitory machine-readable storage medium of claim 15, wherein activating the PIM data traffic forwarding function comprises: sending a PIM-DR failover event notification to the PIM process of the first network device.

20. The non-transitory machine-readable storage medium of claim 15, wherein the first network device and the second network device are configured as a multi-chassis link aggregation group (MC-LAG).

* * * * *